FIG. 4

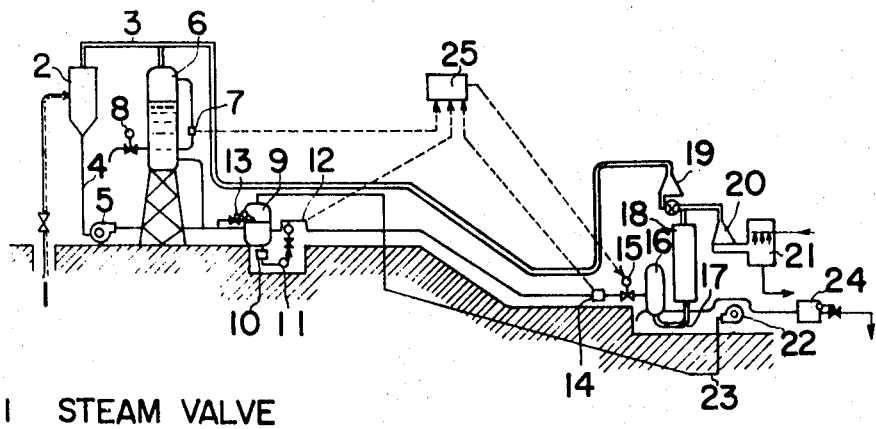

1. STEAM VALVE
2. STEAM SEPARATOR
3. PRIMARY STEAM TRANSPORTING PIPE
4. HOT WATER TRANSPORTING PIPE
5. HOT WATER PUMP
6. HOT WATER HEAD TANK
7. LEVEL GAUGE
8. ELECTRIC OPEN BLOW OFF VALVE
9. TEMPERING WATER SPRAY TANK
10. STRAINER
11. SPRAY PUMP
12. FLOW METER
13. HIGH LEVEL DISCHAGE VALVE
14. FLOW METER
15. ELECTRICAL OPEN CONTROLLER
16. HOT WATER FLUSHER
17. SECONDARY STEAM PIPE
18. CLEANER
19. HIGH PRESSURE TURBINE
20. LOW PRESSURE TURBINE
21. CONDENSER
22. TEMPERING WATER PUMP
23. TEMPERING WATER PIPE
24. WATER DISCHARGE TANK
25. COMPUTING CONTROLLER

INVENTORS
KENTARO AIKAWA
MAMORU TAHARA

BY

ATTORNEYS

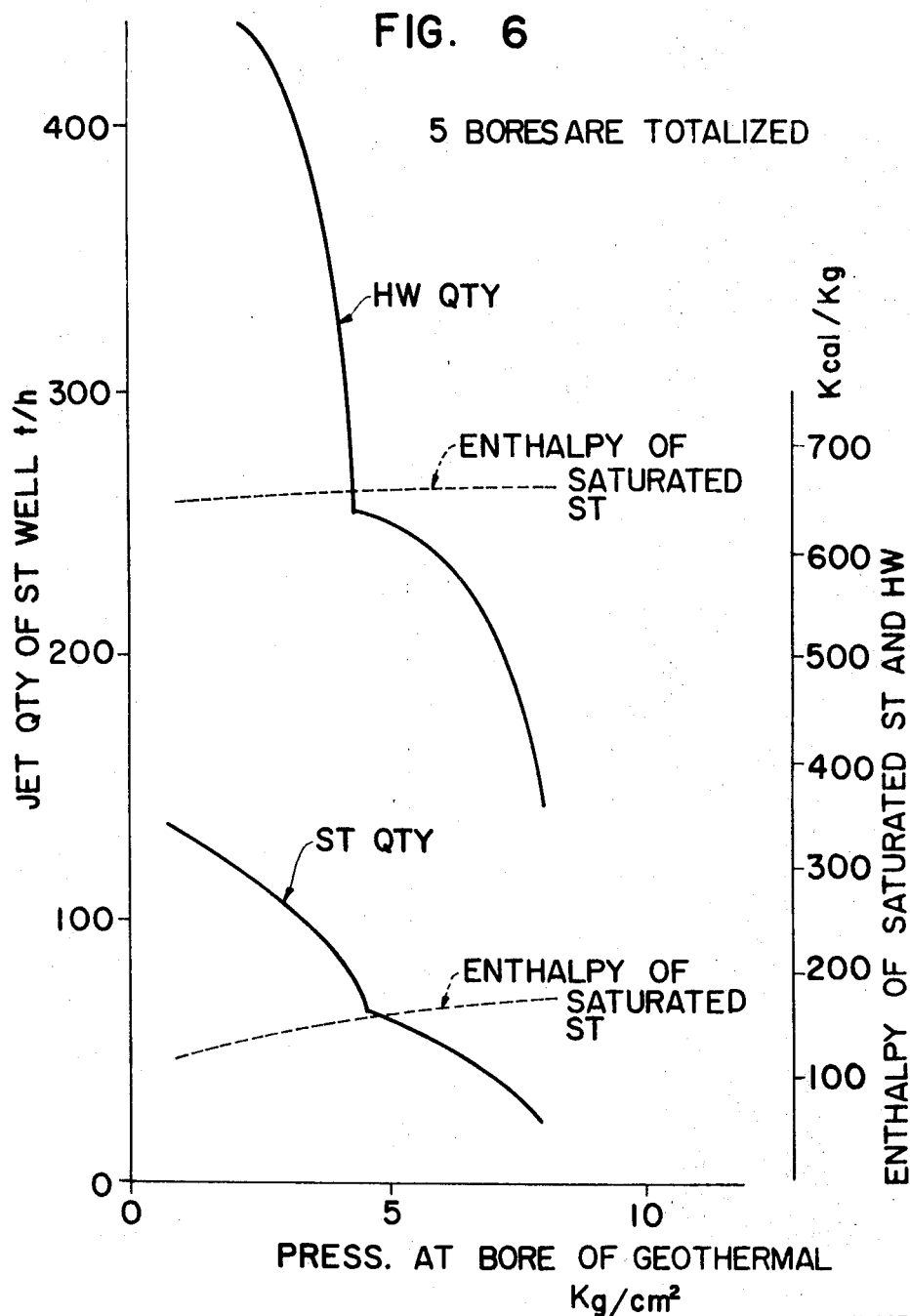

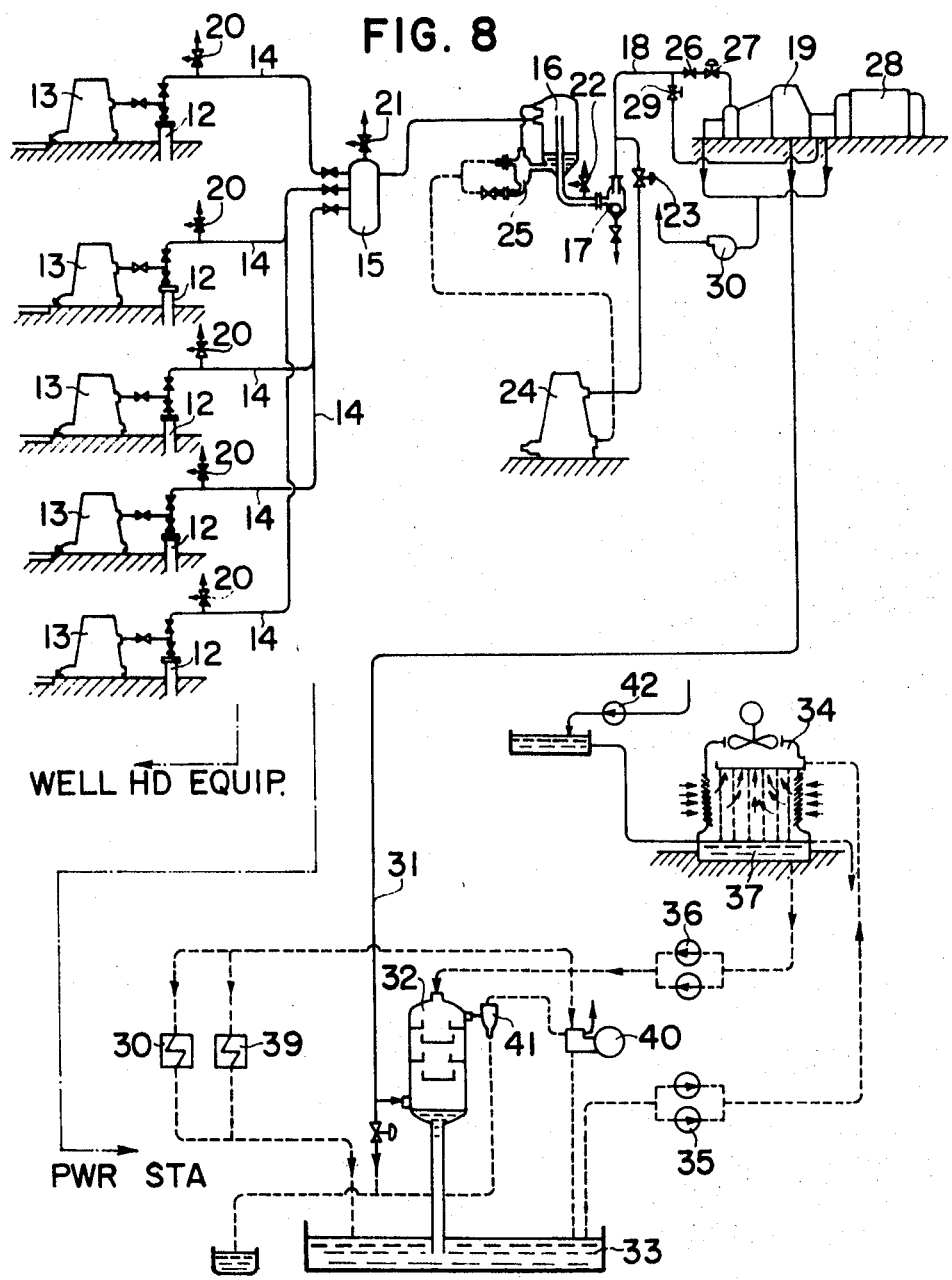

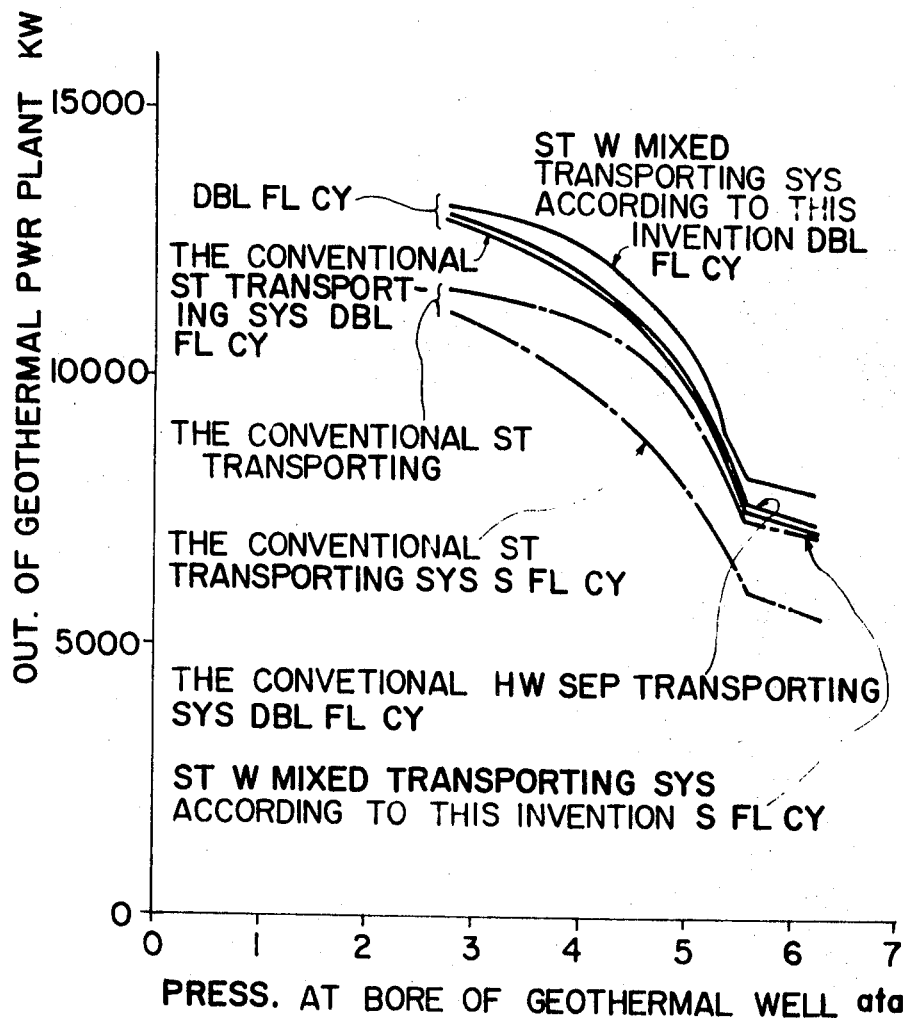

United States Patent Office 3,605,403
Patented Sept. 20, 1971

3,605,403
TRANSPORTING MEANS AND EQUIPMENT FOR JET ENERGY OF GEOTHERMAL POWER PLANT
Kentaro Aikawa and Mamoru Tahara, Nagasaki-shi, Japan, assignors to Mitsubishi Jukogyo Kabushiki Kaisha, Tokyo, Japan
Filed Sept. 24, 1969, Ser. No. 860,476
Int. Cl. F03g 7/04
U.S. Cl. 60—26                2 Claims

ABSTRACT OF THE DISCLOSURE

In a geothermal power plant which comprises a hot water type geothermal power plant, a mixed fluid of steam and hot water emerging from the bore of a steam well is transported directly to the power plant by means of steam-water mixed fluid carrying pipe lines. The steam-water mixture is separated by a steam separator into high pressure primary steam and hot water at the power station with the former steam being supplied to the primary steam inlet of a mixed pressure turbine, and the hot water being used for production of low pressure secondary steam by a hot water flasher which is then supplied to the secondary steam inlet of the same turbine for generating electric power.

BACKGROUND OF THE INVENTION

The present invention relates to a jet energy transporting means of and equipment for a hot water type geothermal power plant for electric generation by utilizing subterranean heat.

In recent years throughout the world geothermal power generation has mostly utilized natural superheated steam which issues from the earth and the development of hot water type geothermal electric generation has just begun, however, as soon as a test plant has been completed for placement in actual operation, it is promptly spotlighted as a favorite for geothermal power generation.

However, the hot water type geothermal power plant is complicated in its makeup compared with the natural superheated steam type geothermal power plant and, moreover, because of its low quality as a source of geothermal energy, the hot water type requires large diameters for its steam transporting pipes, and hot water transporting pipes, than for the natural superheated steam type with a resultant increase in generating cost. Moreover, generally in a geothermal power plant a number of wells have to be sunk over the entire area of a geothermal zone and a number of steam transporting pipe lines having varying lengths of from about 50 m. to 1 km. are installed between the bore of well and a location at the power station for supplying the steam to the turbine for power generation. As a result the proportion of the steam transport piping equipment in the installation cost of a whole power plant becomes so great that it can not stand comparison with an ordinary steam thermal power plant. In consequence, the selection of the fluid transporting system is a key point in determining the economical value of geothermal power generation.

FIG. 1 illustrates a block diagram for a conventional hot water type geothermal power plant. This plant is of a single flush cycle system in which the steam and water mixed fluid is separated into its steam and hot water components at the site of bore of well and only the separated steam is transported to the power station to be utilized for power generation. However, in such hot water type geothermal power generation, in order to utilize the geothermal energy effectively the hot water separated from the steam has to be flashed again to produce secondary steam for use in a mixed pressure steam turbine, so that it may be utilized advantageously to gain more electric power by employment of a multi-stage flash cycle system. Therefore, we consider the same system will receive greater popular demand in the near future. The flow sheets for these systems adapted in the past are as shown in FIG. 2 and FIG. 3. That is, FIG. 2 shows a steam transporting system, in which the steam-water mixed fluid discharged out of the earth is separated into steam and water at the bore of well and only the primary high pressure steam is transported to the power station through steam pipe lines and simultaneously the secondary low pressure steam produced from the separated hot water by means of a hot water flasher is also intended to be transported to the power station through the independent steam pipe lines.

Also, FIG. 3 shows a hot water separate transporting system in which the primary steam separated from the hot water at the bore of well is transported to the power station through the steam pipe lines and at the same time the separated hot water is also transported to the power station through hot water pipe lines and is utilized to produce secondary low pressure steam by means of a hot water flasher for supplying the lower pressure steam to a mixed pressure turbine.

However, the steam transporting system, as shown in FIG. 2, is quite stable and sure in operation because both the primary piping system and secondary piping system carry steam only, however, the specific volume of steam to be handled is large and the pressure losses in the transporting pipe lines directly result in a decrease in the plant output, so that the flow velocity is kept low, thus requiring the use of large diameter transporting pipes. Therefore, such a transporting system is, in general, not economically suitable except in a plant where the power station is located near the geothermal wells.

Moreover, in the separate hot water transporting system as shown in FIG. 3, the secondary piping system carries only the hot water, the specific volume of which is very small, so that the hot water velocity of about $\frac{1}{20}$ of the steam velocity can be safely selected, with the result that a small diameter of transporting pipes can be advantageously adopted. Moreover, because of small pressure losses in the secondary pipe line the plant efficiency is much superior to the system which transports only steam. In the usual thermal steam power plant, as is very often experienced, a very severe hammering action is likely to happen during the transportation of high temperature liquid, and as a result the operation becomes unstable. In order to prevent this it is required to adapt a complicated and expensive control system such as shown in FIG. 4.

OBJECT OF THE INVENTION

The present invention is intended as an improvement of the above conventional transporting systems, eradicating the above defects. Accordingly, it is the primary object of the invention to provide a transporting means for a hot water type geothermal power plant by which the steam-water mixed fluid emerging from the bore of well in the geothermal power plant is directly transported to the power station and is separated into steam and hot water at the power station for use in power generation.

Another object of this invention is provide equipment for a hot water type geothermal power plant comprising a steam separator for the hot water type geothermal power plant which is installed in the power station and is connected to the bore of well by means of the steam-water mixed fluid transporting pipe lines.

SUMMARY OF THE INVENTION

The geothermal power plant contemplated according to this invention can reduce installation costs and at the same time utilize effectively geothermal energy of comparatively low quality, thus producing electric power efficiently for greatly improving the economical value of geothermal power generation.

With regards to the operational stability of the steam-water mixed fluid transporting system to date there has been some uneasiness, however, even in case the hot water has a weight of 4–5 times as large as the steam in the ratio, the specific volume of the hot water is equal to $1/500$–$1/1000$ of the steam, so that the space within the transporting pipe line may be considered as almost completely occupied by the steam. This is a kind of compressible fluid, so that no problem comes into question with reference to its stability and this fact can be easily proved by theoretical analysis and model experiment.

Namely, it is well known that in the steam-water mixed transporting pipe line, if the same flow velocity is taken for both cases, the pressure loss increases considerably compared with the case of steam flow alone, however, according to the test results by the model of the mixed steam-water transporting pipe line, though some effect may be given depending upon the pipe configuration, the pressure loss in the mixed steam-water transportation amounts to 4–5 times as much as that in independent steam transportation as illustrated by the pressure loss curve of a transporting pipe in FIG. 5. It might be due to the above reason that in the projection of the hot water type geothermal power generation in the past the mixed steam-water transportation has not been used. However, as matter of fact the characteristics of the hot water type geothermal steam well are represented as shown in FIG. 6.

The steam well is substantially provided with such characteristics that the jet energy is nearly constant below a normal working pressure range of 4–5 ata. That is, although the quantity of hot water may decrease with a rise in pressure, on the contrary the enthalpy of hot water increases, so that the jet energy is kept almost constant. Accordingly, in the mixed steam-water transporting system of hot water type geothermal power generation the jet energy of the geothermal steam well does not decrease notwithstanding an increase of the pressure loss of the pipe line, so that the economical power generation can be achieved.

The invention will be more fully understood from the following detailed description and the drawings with reference to a preferred embodiment.

BRIEF DESCRIPTION OF THE DRAWINGS

In the drawings:

FIG. 4 is a schematic side view showing an arrangement of the main machines and apparatus for the hot water control equipment according to the diagram of FIG. 3;

FIG. 6 is a characteristic curve of the hot water type geothermal well;

FIG. 8 is a complete block diagram for a hot water type geothermal power plant representing another embodiment of the present invention; and FIG. 9 is a diagram for illustrating output characteristics of a hot-water-type geothermal power plant according to the invention in comparison with a conventional geothermal power plant.

DESCRIPTION OF THE PREFERRED EMBODIMENT

Figure 7:
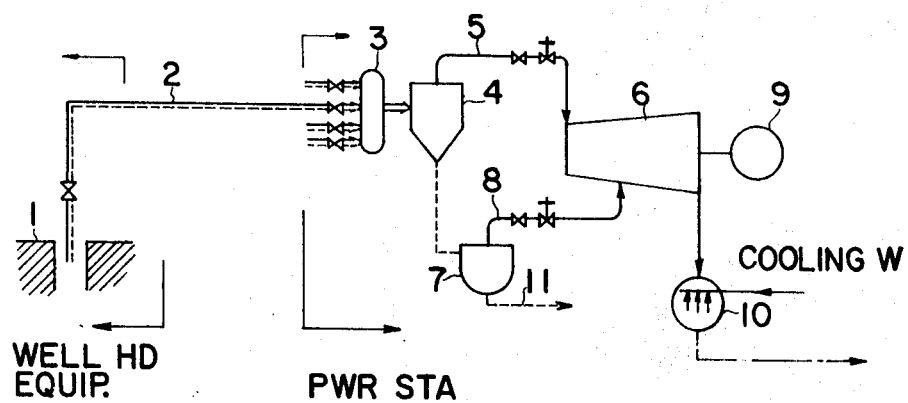
FIG. 7 is a flow sheet for a geothermal power plant using the secondary flash cycle representing flow from the steam well to the power station in accordance with the present invention.

Now, explaining the present invention with reference to the embodiment shown in FIG. 7, a number of steam wells 1 (one well is shown) are disposed in the bore of a well installation. A mixed fluid steam-water transporting pipe 2 directly joined at one end to the steam well 1 is connected at its other end to a steam receiver 3 installed in a power station. A steam separator 4 is connected to the steam receiver 3 and a primary pipe 5 extends from the steam separator to a high pressure steam inlet of a mixed pressure turbine 6. In addition, a hot water flasher 7 is directly connected to the steam separator 4 and a secondary pipe 8 extends from the flasher 7 to a low pressure steam inlet of the mixed pressure turbine 6. The power station includes a turbogenerator 9, a condenser 10, and a waste hot water pipe 11.

In the operation of the equipment constituted above, at first if natural steam and hot water are mixed at the discharge from the steam well 1, the mixed fluid emitted is transported to the power station through the transporting pipe lines 2 without being separated and after being accumulated in the steam receiver 3 it is supplied into the steam separator 4. High pressure steam, separated in the separator 4, flows through the primary steam pipe 5 to the high pressure steam inlet of the turbine 6, and the hot water, separated in the separator 4, is supplied to a hot water flasher 7, from where the low pressure steam produced from the hot water is supplied through the secondary steam pipe 8 to the low pressure steam inlet of the same turbine 6, thus contributing further to rotation of the turbine rotor to increase its output. As explained above, the steam and hot water discharge from the well 1 are transported directly to the steam receiver 3 at the power station by the transporting pipe lines 2 without being separated from each other at the bore of well and they are accumulated in the steam receiver 3.

The primary high pressure steam is separated from the hot water within the large capacity steam separator 4, and the secondary low pressure steam is produced by the separated hot water within the hot water flasher 7 located near to the separator 4, and both kinds of steam are supplied to the mixed pressure turbine 6 to generate electric power. Therefore, the transporting pipe line 2 between the well 1 and the power station requires only one line and also the specific volume of the steam-water mixture is nearly equal to that of the steam in the same condition of pressure and temperature so that the transporting pipe may have the same diameter as the pipe which transport only primary steam in the conventional steam transporting system and, moreover, since the steam separator 4 and hot water flasher 7 are installed close together at the power station the equipment requirements at the bore of the well are simplified thus affording considerable savings in the cost of the engineering work. Furthermore, by effectively utilizing the geothermal energy having comparatively low quality, it is possible to efficiently generate electric power to promote economical of geothermal development power.

The embodiment illustrated in FIG. 8 is a complete block diagram in which the present invention is adapted to a geothermal power plant of the primary flash cycle system. Explaining as to FIG. 8, when the mixture of natural steam and hot water are discharged from the bores of wells 12 which are sunk up to 300–1000 m. into the ground, the mixed fluid is not separated at the wells but is directly transported to a power station through the transporting pipe lines 14 and is collected in a steam receiver 15.

Further, well silencers 13 are installed adjacent the outlets from the wells for exhausting steam to the atmosphere when power generation is shut down, because the wells can not be made in-operative even if the power station is shut down. The steam-water mixed fluid collected in the steam receiver 15 is supplied to a steam separator 16 wherein the mixed fluid is separated for the first time and the separated steam is fed to a turbine 19 through a ball check valve 17 and a main steam pipe 18 to be applied for generating electricity. Further, each of the pipes 14 and 18 and steam receiver 15 is provided with a safety valve of 20, 21, and 22. The ball check valve 17 is designed peculiarly to the hot water type geothermal power plant so as to prevent penetration of the separated hot water into the turbine 19 through the main steam pipe 18 if the separator 16 should fill with the hot water due to any fault. The check valve 17 performs its function of shutting off the hot water by utilizing the buoyancy of a hollow ball if the hot water enters the check valve. Further, a discharge valve 23 provided in a branch pipe from the main steam pipe 18 regulates the turbine inlet pressure and also serves as an emergency device, by means of an interlock with a speed governor, at the time of shutting down the turbine to immediately discharge the main steam to the atmosphere through a silencer 24 at the power station. The hot water separated from the steam within the steam separator 16 is fed to the silencer 24 for discharge to the atmosphere for maintaining the water level by means of a level controller 25.

The power plant includes a main stop valve 26, a speed governor valve 27, a steam turbine 19, an electric generator 28, a grand steam regulating valve 29, and a grand fan 30, and their construction and performance are the same as those used in known ordinary thermal power generation.

The steam discharged from the turbine 19 passes through an exhaust pipe 31, is condensed within a condenser 32 and then collects in a hot water tank 33.

Further, in the case of geothermal power generation it is not necessary to recover the steam as pure water, so that in general a jet system which mixes the exhaust steam directly with the cooling water is used. The hot water accumulated in the hot water tank 33 is cooled by a cooling tower 34 and is recirculated by a hot water pump 35 and a cooling water pump 36, whereby the cooling water is secured. Cooling water from a cooling water tank 37 is also supplied to an air cooler 38 of the generator 28 to an oil cooler 39 for lubricating oil which is used by the cooling water pump 36. Since the natural steam contains a large quantity of non-condensable gas, in order to maintain high vacuum for the condenser 32, a powerful gas extractor 40 is provided to extract only gas which is removed from water by means of a mist separator 41 and then is exhausted to the atmosphere. Moreover, 42 is a water pump for feeding make-up water to the cooling water tank 37.

Next, by comparing output characteristics of the geothermal power plant according to the present invention with those of a conventional geothermal power plant, with reference to FIG. 9 (in this case, steam wells of FIG. 6 are used), it is clear in the characteristic curve in FIG. 9 that the pressure loss of the transporting pipe line is larger according to the present invention and even in case the pressure at steam bore is high the output characteristic is flat, however, this is due to the fact that the steam separator is located at the power station.

Namely, the saturated temperature of waste hot water finally discharged from the plant is determined by the pressure within the steam separator, so that in the past when the steam separator was installed near the steam bore the pressure within the separator was high and steam energy wasted was also large, however, according to the present invention, as the separator is installed at the power station the pressure within the separator is low and the energy wasted also is small. Moreover, in the mixed steam-water transporting pipe lines the hot water is continuously flashed according to increase of the pressure for gradually increasing the steam quantity, so that the steam quantity at the power station inlet is increased much more than that at the bore, due to the decreasing in the quantity of hot water discharged outside the plant.

On the other hand, in the conventional stream transporting system, raising the pressure at the bore of the well tends to raise the saturated temperature of the hot water wasted away outside the plant, and, as a result of this, the efficiency of the power plant will deteriorate. Now, assuming that the steam transporting system of the geothermal power plant illustrated in FIG. 1 is replaced with the steam-water mixed transmission system power plant of this invention, as shown in FIG. 8, as the diameter and length of the pipe line remain unchanged the pressure loss of the pipe line increases, however, as the average pressure of the pipe line rises the specific volume of the fluid decreases, so that the fluid velocity becomes less, which therefore functions effectively in offsetting the increase in the pressure loss.

Figure 1:
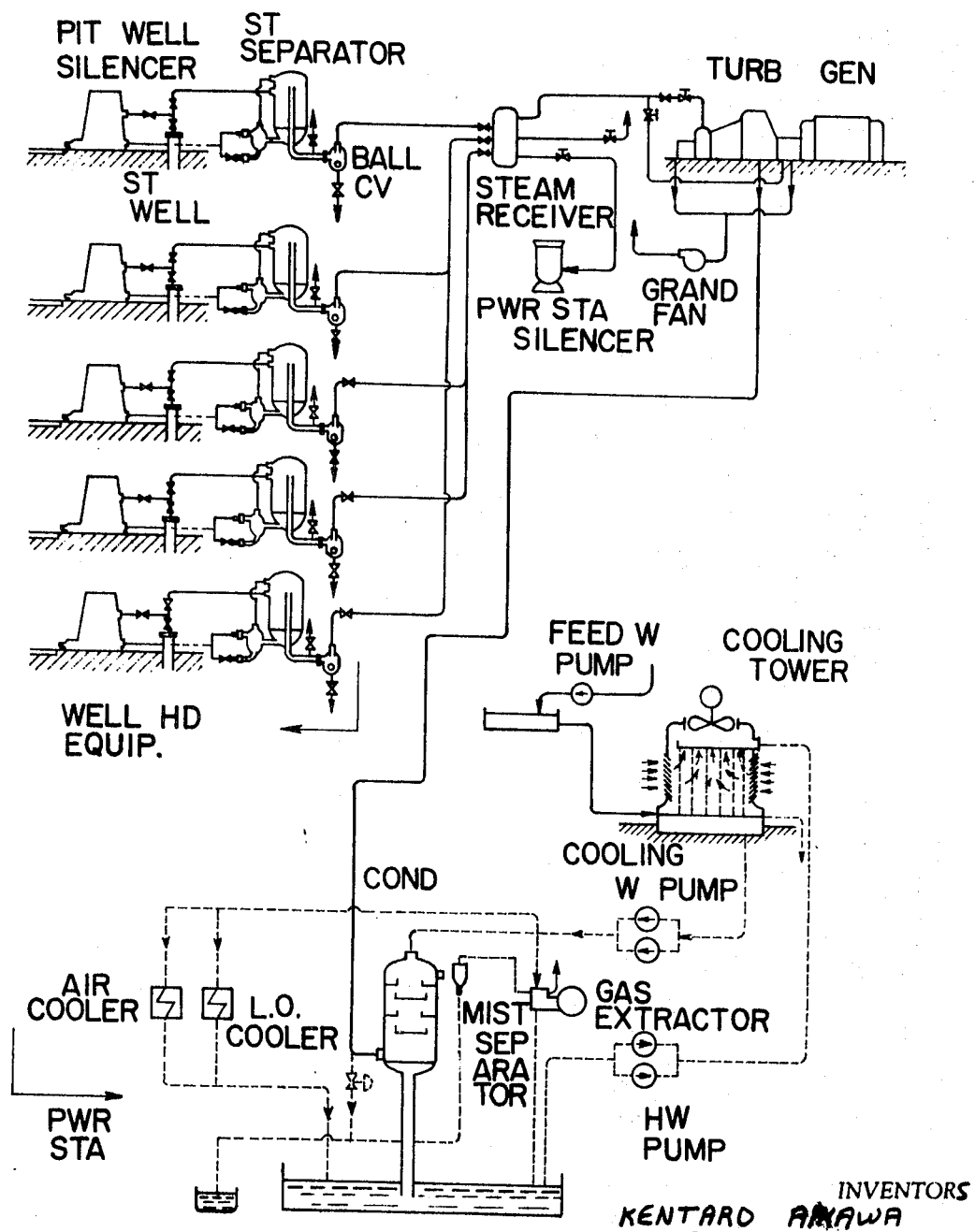
FIG. 1 is a block diagram for an example of a conventional steam transporting system for a hot water type geothermal power plant.
Figure 5:
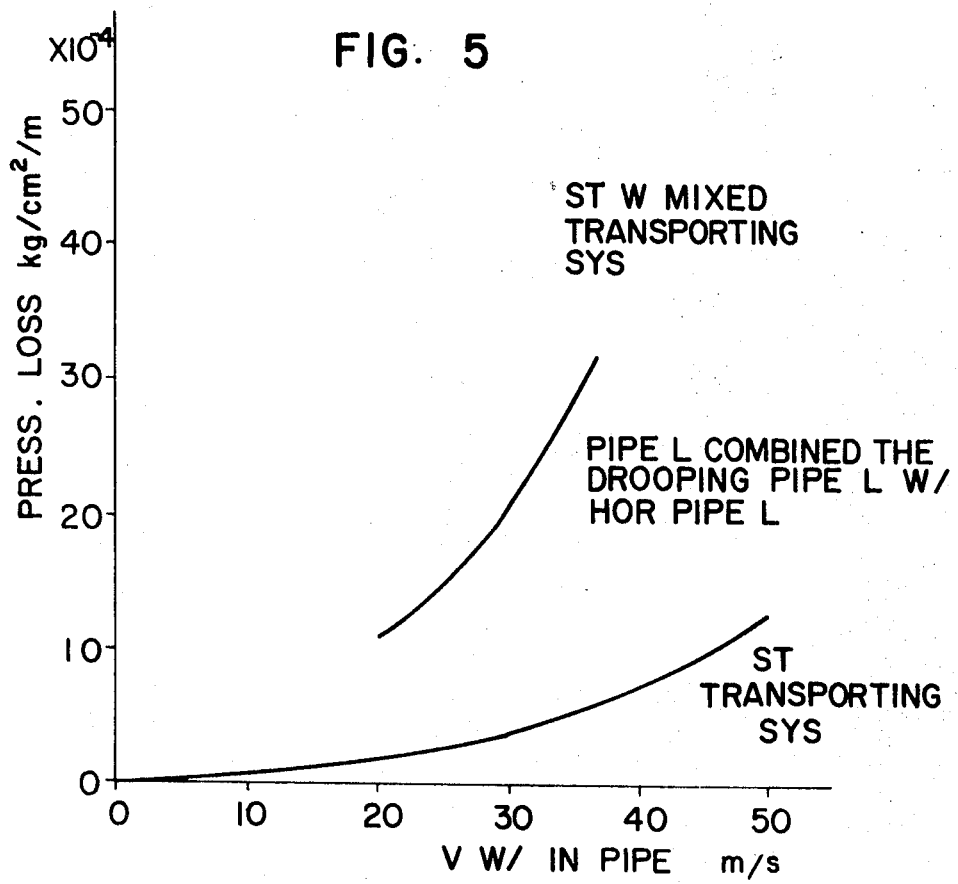
FIG. 5 is a pressure-loss curve of the transporting pipe line.

The pressure drop within the steam pipe line of the geothermal power plant shown in FIG. 1 was 0.4 kg./cm.$^2$ as an average of all pipe lines at the average fluid velocity of 30 m./sec.; however, in the mixed fluid transporting system, according to the present invention, the average pressure drop in the pipe lines is 1.5 kg./cm.$^2$ calculating that the pressure loss at the same fluid velocity from FIG. 5 is 5 times as large as that in the steam transporting system and also considering that the average pressure within the pipe line has increased to decrease the specific volume thus decreasing the fluid velocity. As the turbine inlet pressure is 2.4 ata., the pressure at the bore of well is 2.4+1.5=3.9 ata. The output in this case is 11,100 kw. from FIG. 9. On the other hand, in the steam transporting system as the pressure at bore of well is 2.4+0.4=2.8 ata. the output of the turbine will be 11,100 kw. That is, in the hot water type geothermal generation exclusively utilizing the primary steam with the same investment of installation, the mixed fluid transporting system power plant has almost the same efficiency as the steam alone transporting system power plant. Accordingly, when designing the plant with the same efficiency, the mixed fluid transporting system affords such economy as to reduce the installation cost below that of the other transporting system.

Further, another merit of the mixed fluid transporting system is that because the steam is separated from water at the power station site it is very easy to establish a multi stage flash cycle power plant with only the investment of a minor installation cost to the secondary steam system. The output in the mixed fluid transporting system when adapting to two stage flash cycles will be 12,570 kw. as illustrated in FIG. 9, so that an increase of 13% in the output can be immediately accomplished.

Figure 2:
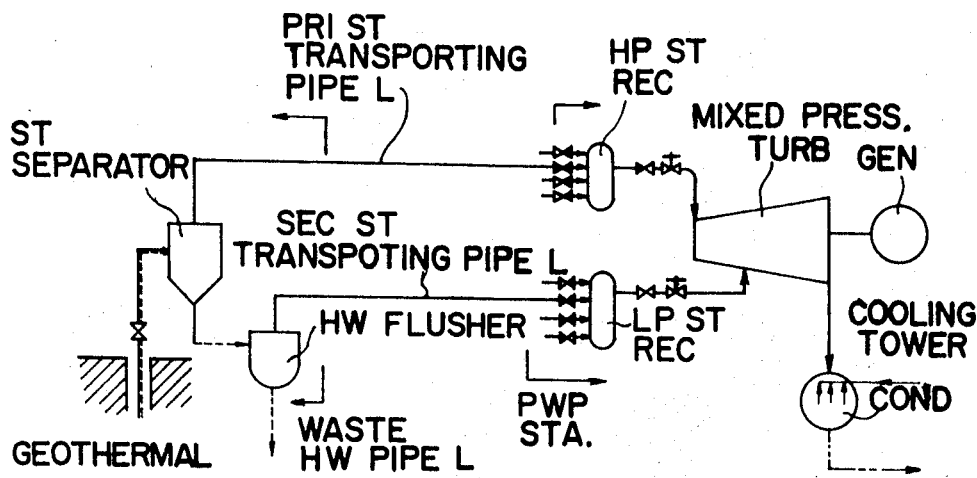
FIG. 2 and FIG. 3 are flow sheets for other examples of similar conventional hot water type geothermal power plants.
Figure 3:
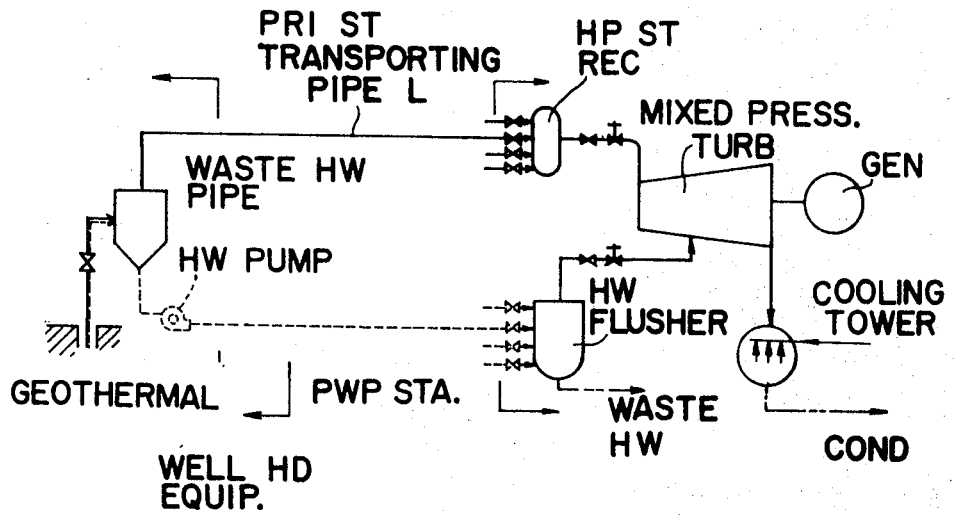

Of the conventional two stage flash cycle geothermal power plants, the separate hot water transporting system of FIG. 3 is superior in both efficiency and installation cost to the steam transporting system of FIG. 2. In comparing the two systems, the primary steam system in the hot water transporting system power plant is the same as that in the steam transporting system power plant and the pressure at the bore of well is 2.8 ata. and output is 13,000 kw. and comparing this with the output 12,570 kw. of the mixed transporting system power plant according to the present invention, the separate hot water transporting system power plant can produce more output by 430 kw. and is higher by 3.4% in efficiency than the steam transporting system power plant. However, in the separate hot water transporting system power plant power is required for the fluid transfer pumps.

Notwithstanding the above decrease in the efficiency, if the increases in installation cost, maintenance expenditure, and running cost, and the utilization factor of the plant, due to accident as might be caused by complicated controls, as shown in FIG. 4, are taken into consideration the steam-water fluid transporting system power plant of the present invention is better in the view point of comprehensive economy than the hot water separate transporting system.

As thus far explained, a feature of the invention is that the steam-water mixed fluid emitted from the bore of the well of the steam wells in the hot water type geothermal power plant is transported intact to the power station where it is separated into steam and hot water for utilization in power generation. According to this invention, not only can the geothermal power plant be constructed economically but also the natural steam energy may be utilized as effectively and efficiently as possible for power generation to improve greatly its economical value, so that this hot water type geothermal power plant, which has not hitherto been considered as a commercial base due to the low quality of energy, is now capable of considerably extending the feasible zone of the development of such plants. Further, another feature of the invention is that the steam separator of the hot water type geothermal power plant is installed at the power station for connection with the bore of the well of the steam wells by means of the steam-water mixed fluid transporting pipe lines. One transporting pipe connected between the bore and the separator is sufficient so that the installation cost of the secondary steam flow system may be considerably reduced. Consequently, the cost of transporting pipes which occupies most of the entire plant installation cost becomes low and further, the diameter of the transporting pipe may be quite the same as that of the primary steam pipe in the conventional steam transporting system and, more, the steam separator and hot water flasher may be installed close together in the power station, so that the equipment located at the bore of the well is simplified and the equipment cost for the entire hot water type geothermal power plant is extremely reduced. Further, the feasible locations of geothermal plant development, are located mostly within the natural site and from the view point of protection of sight seeing resources installation of geothermal power plants very often cause troubles since the natural beauty of the plant site is injured by the exterior appearance of the plant, however, the equipment at the bore of the well, the transporting pipes and so forth can be made compact without sacrificing the efficiency of the power pant and now the installation of the geothermal power plant as well as utilization of natural resources is extremely advantageous and important from the social view point.

While the form of equipment herein described constitutes a preferred embodiment of the invention, it is to be understood that the invention is not limited to this embodiment, and that changes may be made herein without departing from the scope of the invention which is defined in the appended claims.

What is claimed is:

1. A geothermal power plant for converting the thermal energy from geothermal wells into electrical energy where the power plant is spaced a considerable distance from the site of the well, comprising a tubular casing for collecting the mixture of steam and hot water issuing from the geothermal well, a transporting pipe connected to said tubular casing and extending continuously therefrom to the location of the plant, a receiver positioned at the location of the plant and connected to the plant end of said transporting pipe for receiving and collecting the mixture of steam and hot water flowing through said pipe, duct means having an inlet end and an outlet end with the inlet end thereof connected to said receiver, a steam separator connected to the outlet end of said duct means for receiving the mixture of steam and hot water and for separating the mixture into its steam and hot water components, a mixed pressure turbine having a high pressure steam inlet and a low pressure steam inlet, first conduit means extending between said steam separator and the high pressure stream inlet to said mixed pressure turbine for conveying steam from said separator to said turbine for conversion into electrical energy, a hot water flasher disposed in communication with said steam separator for receiving hot water therefrom and for flashing at least a part of the hot water into steam at a lower pressure than the steam in said separator, second conduit means extending between said hot water flasher and the low pressure steam inlet to said mixed pressure turbine for conveying the low pressure steam to said turbine for additional conversion of the thermal energy from said well into electrical energy.

2. A geothermal power plant, as set forth in claim 1, wherein a buoyant ball type check valve is located in said first conduit means between said steam separator and the high pressure steam inlet to said mixed pressure turbine so that any hot water which enters said first conduit means from said steam separator is blocked by the buoyant ball from flow into said turbine.

References Cited

UNITED STATES PATENTS

| | | | |
|---|---|---|---|
| 3,172,266 | 3/1965 | Strohmeyer | 60—105 |
| 3,175,367 | 3/1965 | Gorzegno | 60—105X |
| 3,194,217 | 7/1965 | Grabowski | 60—105X |
| 3,472,209 | 10/1969 | Roffler | 122—483X |

OTHER REFERENCES

Scientific American, "Power From The Earth," by Albert G. Ingalls, November 1929, pp. 222–224.

MARTIN P. SCHWADRON, Primary Examiner

A. M. OSTRAGER, Assistant Examiner

U.S. Cl. X.R.

60—108